(12) United States Patent
Beilman et al.

(10) Patent No.: US 11,708,034 B2
(45) Date of Patent: Jul. 25, 2023

(54) MODULAR ROOF RACK ASSEMBLY AND RECONFIGURATION METHOD

(71) Applicant: Ford Global Technologies, LLC, Dearborn, MI (US)

(72) Inventors: Mark Beilman, South Lyon, MI (US); Gregory S. Hawkins, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/476,946

(22) Filed: Sep. 16, 2021

(65) Prior Publication Data

US 2023/0083627 A1    Mar. 16, 2023

(51) Int. Cl.
*B60R 9/045* (2006.01)
*B60R 9/058* (2006.01)

(52) U.S. Cl.
CPC .............. *B60R 9/045* (2013.01); *B60R 9/058* (2013.01)

(58) Field of Classification Search
CPC ................................. B60R 9/045; B60R 9/058
USPC ....................................................... 224/320
See application file for complete search history.

(56) References Cited

U.S. PATENT DOCUMENTS

| | | | | |
|---|---|---|---|---|
| 3,330,454 A | * | 7/1967 | Bott | B60R 9/045 224/326 |
| 5,377,890 A | * | 1/1995 | Brunner | B60R 9/045 224/315 |
| 5,676,291 A | * | 10/1997 | Wolf | B60R 9/00 224/325 |
| 6,425,508 B1 | * | 7/2002 | Cole | B60R 9/045 224/330 |
| 8,016,172 B1 | * | 9/2011 | Mefford | B60R 9/045 224/325 |
| 9,827,915 B1 | * | 11/2017 | Chappell | B60R 9/045 |
| 10,005,402 B2 | * | 6/2018 | Huang | B60R 9/042 |
| 10,369,934 B2 | * | 8/2019 | Wang | B60R 9/045 |
| 2005/0023314 A1 | | 2/2005 | Williams et al. | |
| 2008/0149675 A1 | * | 6/2008 | Moreau | B60R 9/045 224/320 |
| 2010/0327033 A1 | * | 12/2010 | Payne | B60R 9/058 224/326 |
| 2011/0038698 A1 | * | 2/2011 | Li | B60P 3/14 414/479 |
| 2015/0246643 A1 | * | 9/2015 | Levi | B60R 9/045 182/113 |
| 2017/0072865 A1 | * | 3/2017 | Pagel | B60R 9/045 |

(Continued)

FOREIGN PATENT DOCUMENTS

CN    107585107 A    1/2018

*Primary Examiner* — Peter N Helvey
(74) *Attorney, Agent, or Firm* — Vichit Chea; Carlson, Gaskey & Olds, P.C.

(57) ABSTRACT

A motor vehicle roof rack assembly according to an exemplary aspect of the present disclosure includes, among other things, side rails of a roof rack. The side rails each extend longitudinally from a first end portion to a second end portion. The assembly also includes crossbars of the roof rack. The roof rack is configured to transition between a first configuration and a second configuration, In the first configuration, the first end portions of the side rails are each coupled to a corner. In the second configuration, the first end portions of the side rails are each coupled to a rail extender.

18 Claims, 3 Drawing Sheets

(56) References Cited

U.S. PATENT DOCUMENTS

| | | | |
|---|---|---|---|
| 2018/0056884 A1* | 3/2018 | Ziraldo | B60R 9/052 |
| 2018/0326915 A1* | 11/2018 | Dickinson | B60R 9/045 |
| 2020/0148127 A1* | 5/2020 | Borghi | B60R 9/058 |
| 2020/0199936 A1* | 6/2020 | Nakari | B60R 3/005 |
| 2020/0361393 A1 | 11/2020 | Cabaniss et al. | |
| 2021/0188183 A1 | 6/2021 | Dayani | |
| 2022/0250551 A1* | 8/2022 | Badillo | B60R 9/058 |
| 2022/0250552 A1* | 8/2022 | Dayani | B60R 9/02 |

* cited by examiner

MODULAR ROOF RACK ASSEMBLY AND RECONFIGURATION METHOD

TECHNICAL FIELD

This disclosure relates generally to a roof rack that is modular and has features that facilitate reconfiguring the roof rack.

BACKGROUND

Some motor vehicles include roof racks, which can be used as mounting points for gear, such as luggage or sporting equipment. Roof racks can include cross bars that extend between side rails. A size of the roof rack varies depending on, for example, a size of the vehicle.

SUMMARY

A motor vehicle roof rack assembly according to an exemplary aspect of the present disclosure includes, among other things, side rails of a roof rack. The side rails each extend longitudinally from a first end portion to a second end portion. The assembly also includes crossbars of the roof rack. The roof rack is configured to transition between a first configuration and a second configuration. In the first configuration, the first end portions of the side rails are each coupled to a corner. In the second configuration, the first end portions of the side rails are each coupled to a rail extender.

Another example of the foregoing assembly includes a ladder secured to one of the side rails.

Another example of any of the foregoing assemblies includes a ladder secured to one of the rail extenders when the roof rack in the second configuration.

Another example of any of the foregoing assemblies includes mechanical fasteners that secure the crossbars to the side rails.

In another example of any of the foregoing assemblies, a forward end portion of the roof rack is configured to secure to a windshield frame of a vehicle. A rear end portion of the roof rack is configured to secure to a removeable roof of the vehicle.

Another example of any of the foregoing assemblies includes the roof rack in the first configuration where the roof rack includes a first number of the crossbars. The roof rack in the second configuration includes a second number of the crossbars. The first number is less than the second number.

In another example of any of the foregoing assemblies, the crossbars each have an accessory mounting channel.

In another example of any of the foregoing assemblies, the accessory mounting channel is a T-channel.

Another example of any of the foregoing assemblies includes channel plugs. Each of the channel plugs is received within at least one of the accessory mounting channels.

In another example of any of the foregoing assemblies, the side rails are extruded aluminum.

In another example of any of the foregoing assemblies, the side rails each include an accessory mounting channel.

Another example of any of the foregoing assemblies includes coupling members. When the roof rack is in the second configuration, each of the coupling members are at least partially received within one of the side rails and at least partially received within one of the rail extenders.

In another example of any of the foregoing assemblies, the corners each have an extension that is received within one of the side rails when the roof rack is in the first configuration, and is received within one of the rail extenders when the roof rack is in the second configuration.

In another example of any of the foregoing assemblies, the extension is a first extension. The corners each have a second extension that is received within a cross rail of the roof rack when the roof rack is in the first configuration and when the roof rack is in the second configuration.

In another example of any of the foregoing assemblies, the second end portions of the side rails each receive an extension of a corner when the roof rack is in the first configuration and in the second configuration.

In another example of any of the foregoing assemblies, the second end portions are closer to a front end of the vehicle than the first end portions.

A motor vehicle roof rack reconfiguration method according to another exemplary aspect of the present disclosure includes, among other things, providing a roof rack of a first configuration where side rails of the roof rack are each coupled to a corner, and reconfiguring the roof rack to have a different, second configuration by uncoupling the rails corners from the side rails, and then coupling each of the side rails of the roof rack to a first end of a rail extender.

In another example of the foregoing method, the roof rack in the first configuration has a first longitudinal length and the roof rack in the second configuration has a second longitudinal length that is greater than the first longitudinal length.

Another example of any of the foregoing methods includes, during the reconfiguring, attaching an opposite, second end of the rail extenders to the corner or another corner.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
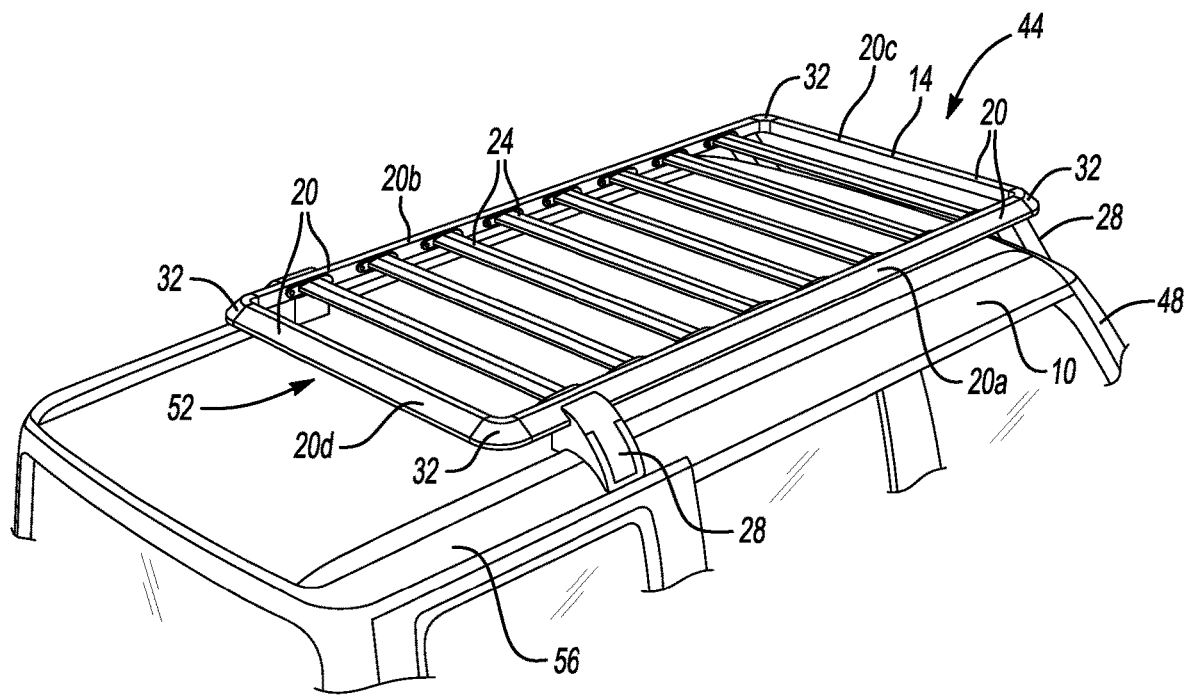
FIG. 1 illustrates a perspective rear view of an area of a vehicle having a roof rack in a first configuration.

This disclosure details a vehicle roof rack that includes features facilitating reconfiguring the roof rack. The roof rack can be reconfigured to be longer or shorter, for example.

With reference to FIGS. 1 to 4, a motor vehicle 10 includes a roof rack assembly 14. While the example vehicle is an SUV, this disclosure is applicable to roof racks used with other types of vehicles.

The roof rack 14 is a modular roof rack. As desired, the roof rack 14 can be transitioned back and forth between a first configuration, shown in FIG. 1 and a second configuration shown in FIG. 3. Generally, in this example, the first configuration is a standard configuration and the second configuration is an extended configuration. More specifically, the example roof rack 14 in the first configuration has a first longitudinal length and the roof rack 14 in the second configuration has a second longitudinal length that is greater than the first longitudinal length.

The roof rack 14 can be transitioned to a particular configuration to accommodate certain types of loads, or to adapt to a size of the vehicle 10. For example, a vehicle model have a shorter length can utilize the roof rack 14 in the first configuration and a vehicle model having a longer length can utilize the roof rack 14 in the second configuration. The ability of the roof rack 14 to adjust to different vehicle models can reduce build complexity.

The roof rack 14 includes a plurality of rails 20, a plurality of crossbars 24, supports 28, and corners 32. The rails 20 include a side rail 20a on a passenger side, a side rail 20b on a driver side, a cross rail 20c at a front of the roof rack 14, a cross rail 20d at the rear of the roof rack 14.

The roof rack 14 in the second configuration additionally includes an extension kit 36 having a rail extender 40a on the passenger side, a rail extender 40b on the driver side, and additional crossbars 24. The roof rack 14 in the second configuration includes more crossbars 24 than the roof rack 14 in the first configuration.

The rails 20 can be extruded, such as extruded aluminum, and can have a common cross-sectional profile. The crossbars 24 can be extruded aluminum, but can have a different cross-section profile than the rails 20. A person having skill in this art would be able to structurally distinguish an extruded component from a component that is not extruded.

In this example, some of the supports 28 secure a forward end portion 44 of the roof rack 14 to a windshield frame 48 of the vehicle 10. Other supports 28 secure a rear end portion 52 of the roof rack 14 to a removeable roof 56 of the vehicle 10. Forward and rearward are, for purposes of this disclosure, with reference to a general orientation of the vehicle 10.

The side rails 20, 20b each extend longitudinally from first end portions that selectively engage the extension kit 36 to the second end portions that are at the forward end portion 44 of the roof rack 14 and closer to a front end of the vehicle 10 than the first end portions.

The roof rack 14 includes various features that facilitate transitioning between the first configuration and the second configuration. For example, the plurality of crossbars 24 are joined to the respective side rail 20a, 20b or rail extender 40a, 40b using mechanical fasteners 60, such as screws. The mechanical fasteners 60 are used instead of welds.

Another feature that facilitates modularity is how the side rails 20a, 20b can selectively couple with one of the corners 32 or with one of the rail extenders 40a, 40b.

The corners 32, in this example, are a polymer-based material. The corners 32, in the exemplary embodiment, each help to join the cross rail 20c to one of the side rails 20a, 20b, or to one of the rail extenders 40a, 40b.

Figure 2:
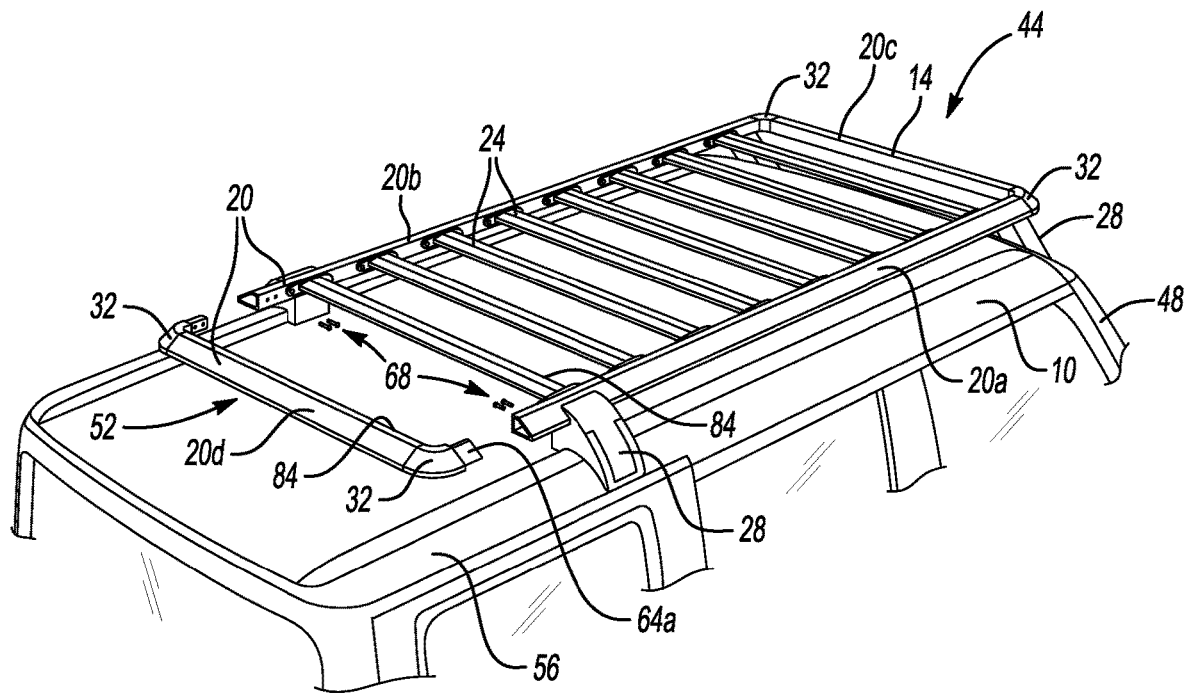
FIG. 2 illustrates the vehicle and roof rack of FIG. 1 when transitioning the roof rack from the first configuration to a second configuration.
Figure 3:
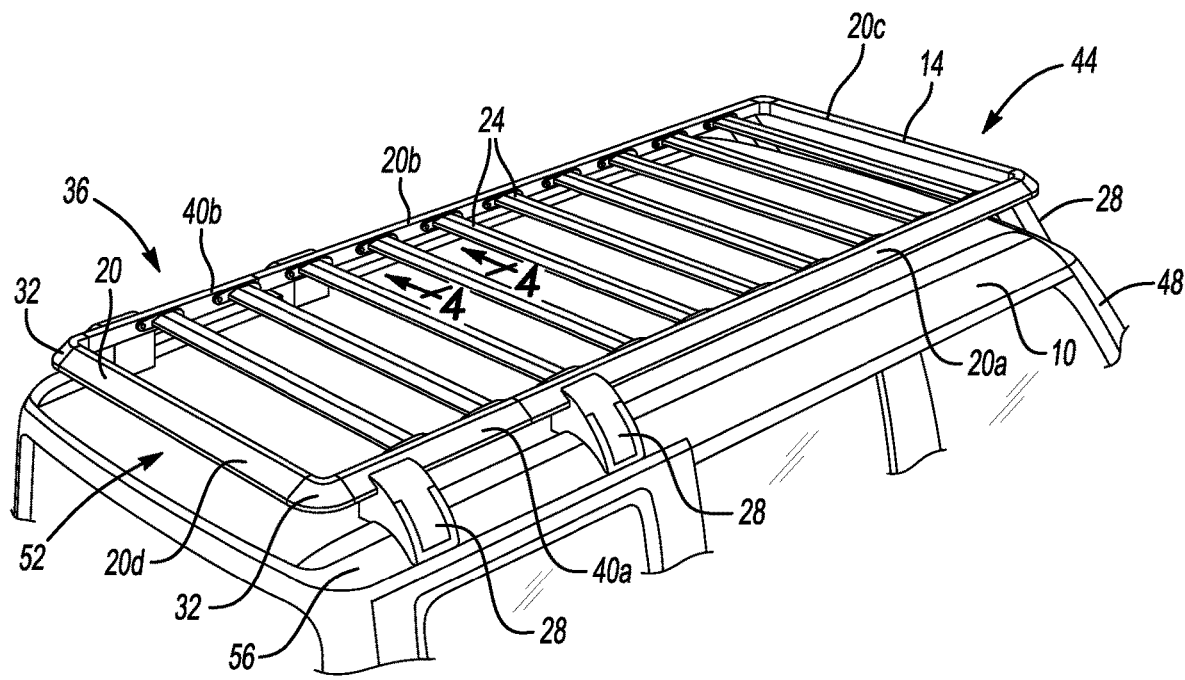
FIG. 3 illustrates the roof rack of FIG. 1 after transitioning the roof rack to the second configuration.
Figure 5:
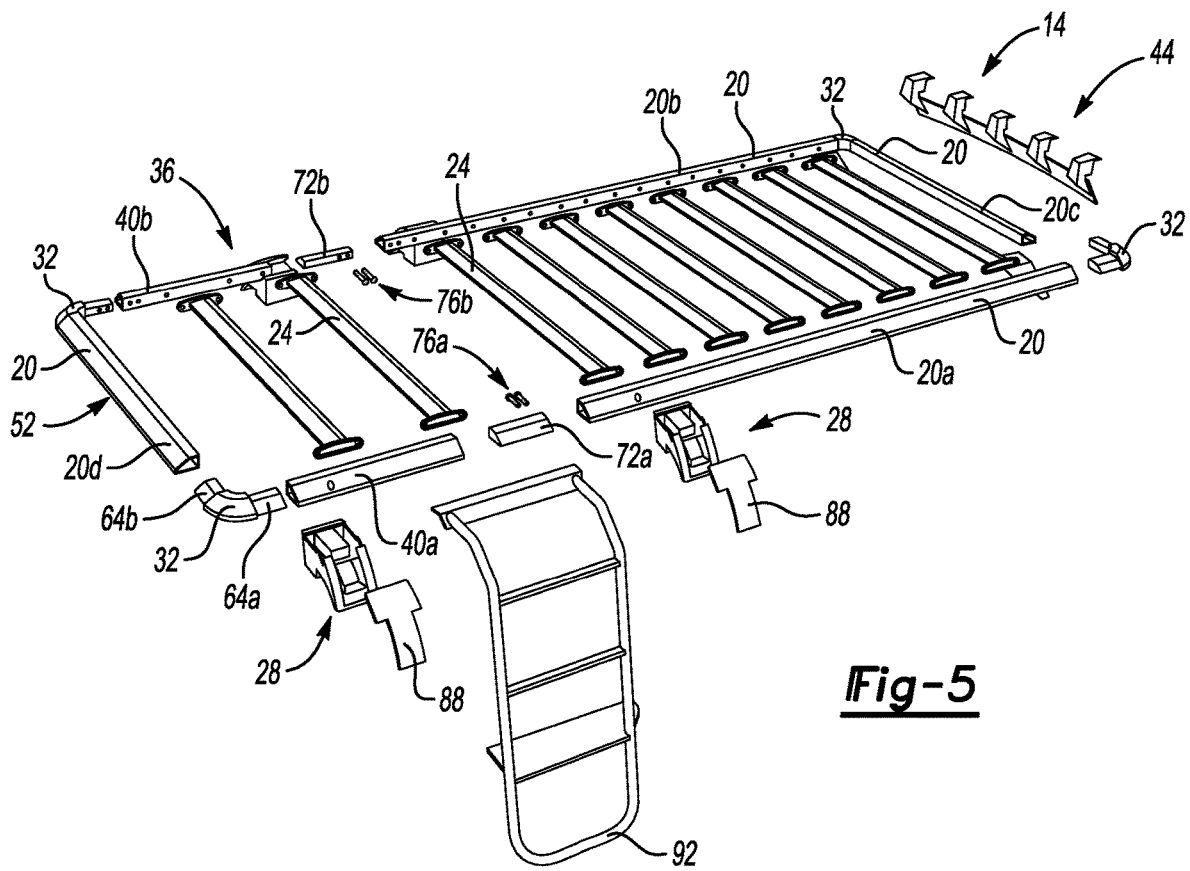
FIG. 5 illustrates an expanded view of the roof rack of FIG. 3.

As shown in FIGS. 2 and 5, the corners 32 include a first corner extension 64a and a second corner extension 64b. When the roof rack 14 is in the first configuration, the first corner extension 64a is received within the side rail 20a. Mechanical fasteners 68 are then used to join the side rail 20a to the first corner extension 64a. The second corner extension 64b is received within one of the cross rail 20d, which is at a rear of the roof rack 14 in this example. Mechanical fasteners are then used to join the cross rail 20d to the second corner extension 64b. The mechanical fasteners can be thread cutting fasteners that cut threads into the respective corner extension as the fasteners are seated.

In the second configuration, the roof rack 14 includes coupling members 72a, 72b. One of the coupling members 72 is at least partially received within the side rail 20a and at least partially received within the rail extender 40a. Mechanical fasteners 76a secure together the coupling member 72b, side rail 20a, and rail extender 40a.

Another coupling member 72b is at least partially received within the side rail 20b and at least partially received within the rail extender 40b. Mechanical fasteners 76b are used to secure together the coupling member 72b, side rail 20b, and rail extender 40b on the driver side.

In the second confirmation, the first corner extension 64a of the corner fits within the rail extender 40a rather than fitting within the side rail 20a.

The coupling members 72a, 72b can be a polymer-based material. The fasteners 76a, 76b can be thread cutting fasteners that cut threads into the coupling members 72a, 72b as the fasteners 76a, 76b are seated.

A method of reconfiguring the roof rack 14 can include providing the roof rack 14 in the first t configuration where side rails 20a, 20b are each coupled to one of the corner 32. The method can involve reconfiguring the roof rack 14 to have a different, second configuration by uncoupling the corners 32 from the side rails 20a, 20b, and then coupling each of the side rails 20a, 20b to the respective rail extender 40a, 40b.

To secure the roof rack 14 to the vehicle 10, the supports 28 can be secured to an area of the vehicle 10 using mechanical fasteners. The supports 28 can include a trim plate 88 that hides the mechanical fasteners after securing the supports.

Figure 4:
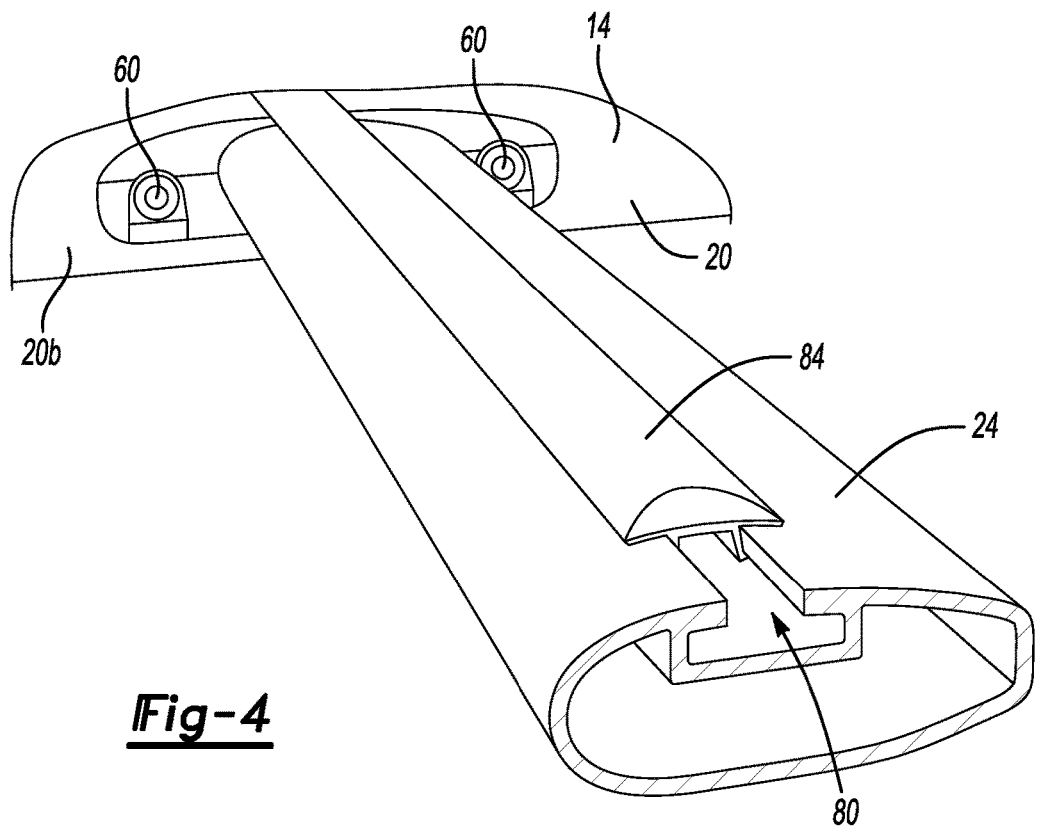
FIG. 4 illustrates a section view taken at line 4-4 in FIG. 3.

Referring to FIGS. 4 and 5, the rails 30 and crossbars 24, in this example, include accessory mounting channels 80, which can be used to attach various accessories to the roof rack 14. The accessory mounting channel 80 is a T-channel as the accessory mounting channel 80 has a T-shaped profile. The accessory mounting channels 80 in other areas of the roof rack 14 mimic the channel 80 shown in FIG. 4.

When the accessory mounting channel 80 is not in use or needed, a channel plug 84 can fit within the accessory mounting channel 80. The channel plug 84 can reduce wind noise and block debris from entering the accessory mounting channel 80.

A ladder 92, as shown in FIG. 5, is an example accessory. The ladder 92 can be secured to the roof rack 14 via the channel 80. The ladder 92 can include tabs that slide into the channel 80 to secure the ladder 92, for example.

Figure 6:
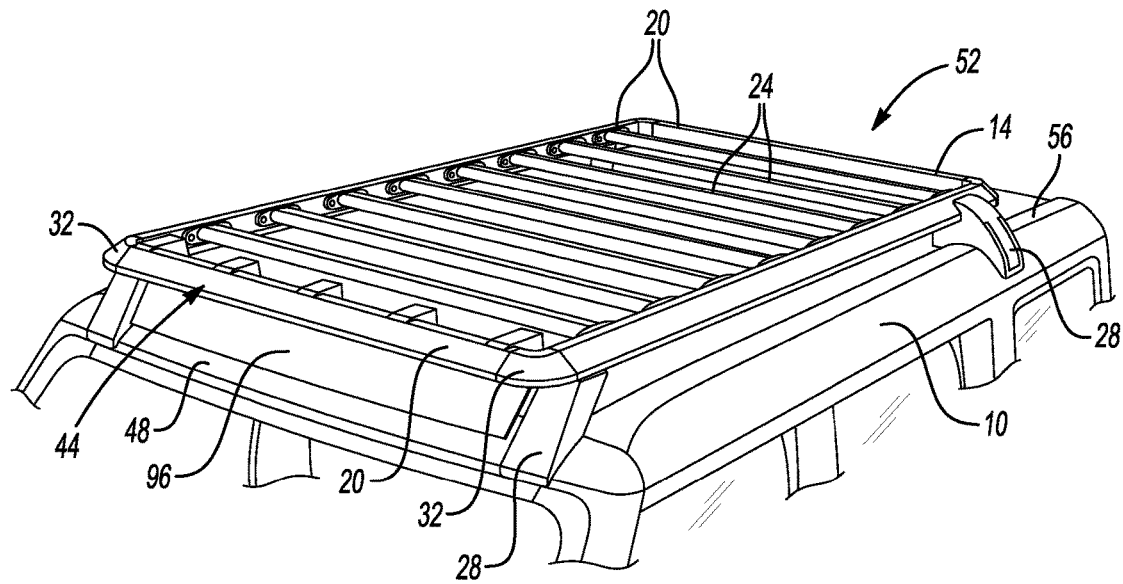
FIG. 6 illustrates a perspective front view of the vehicle of FIG. 1.

As shown in FIG. 6, a wind deflector 96 is another example accessory that can be secured to the roof rack 14, here the cross rail 20c of the roof rack 14, through the accessory mounting channel 80.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A motor vehicle roof rack assembly, comprising:
   side rails of a roof rack, the side rails each extending longitudinally from a first end portion to a second end portion; and
   a plurality of crossbars of the roof rack, wherein the roof rack is configured to transition between a first configuration and a second configuration, in the first configuration, the first end portions of the side rails are each coupled to a corner, in the second configuration, the first end portions of the side rails are each coupled to a rail extender, wherein the plurality of crossbars each include an accessory mounting channel; and
   a plurality of channel plugs each configured to be received a respective one of the accessory mounting channels, the channel plugs extending longitudinally in a cross-vehicle direction when received within the respective one of the accessory mounting channels; and
   a ladder secured to one of the rail extenders when the roof rack in the second configuration, the ladder engaging the one of the rail extenders through an accessory mounting channel within the rail extender.

2. The motor vehicle roof rack assembly of claim 1, further comprising a plurality of mechanical fasteners that secure the crossbars to the side rails.

3. The motor vehicle roof rack assembly of claim 1, wherein a forward end portion of the roof rack is secured to a windshield frame of a vehicle, wherein a rear end portion of the roof rack is secured to a removeable roof of the vehicle.

4. The motor vehicle roof rack assembly of claim 1, wherein the roof rack in the first configuration includes a first number of the crossbars, wherein the roof rack in the second configuration includes a second number of the crossbars, the first number less than the second number.

5. The motor vehicle roof rack assembly of claim 1, wherein the accessory mounting channel is a T-channel.

6. The motor vehicle roof rack assembly of claim 1, wherein the side rails are extruded aluminum.

7. The motor vehicle roof rack assembly of claim 1, wherein the side rails each include an accessory mounting channel.

8. The motor vehicle roof rack assembly of claim 1, further comprising a plurality of coupling members, when the roof rack is in the second configuration, each of the coupling members are at least partially received within one of the side rails and at least partially received within one of the rail extenders, the coupling members separate and distinct from both the side rails and the rail extenders.

9. The motor vehicle roof rack assembly of claim 1, further comprising the corners each having an extension that is received within one of the side rails when the roof rack is in the first configuration, and is received within one of the rail extenders when the roof rack is in the second configuration.

10. The motor vehicle roof rack assembly of claim 9, wherein the extension is a first extension, wherein the corners each have a second extension that is received within a cross rail of the roof rack when the roof rack is in the first configuration and when the roof rack is in the second configuration.

11. The motor vehicle roof rack assembly of claim 1, wherein the second end portions of the side rails each receive an extension of a corner when the roof rack is in the first configuration and in the second configuration.

12. The motor vehicle roof rack assembly of claim 11, wherein the second end portions are closer to a front end of the vehicle than the first end portions.

13. The motor vehicle roof rack assembly of claim 1, further comprising a plurality of supports directly connected to one of the side rails and directly connected to a roof of the vehicle.

14. The motor vehicle roof rack assembly of claim 1, further comprising a plurality of coupling members that, when the roof rack is in the second configuration, are each partially received within a respective rail extender and within a respective side rail.

15. The motor vehicle roof rack assembly of claim 14, wherein the plurality of coupling members are a polymer based material, wherein the rail extenders and the side rails are aluminum.

16. A motor vehicle roof rack assembly, comprising:
   side rails of a roof rack, the side rails each extending longitudinally from a first end portion to a second end portion, the side rails each including a side rail accessory mounting channel;
   a plurality of crossbars of the roof rack, wherein the roof rack is configured to transition between a first configuration and a second configuration, in the first configuration, the first end portions of the side rails are each coupled to a corner, in the second configuration, the first end portions of the side rails are each coupled to a rail extender;
   a cross-rail of the roof rack;
   a plurality of supports, at least one of the supports directly connecting one of the side rails to a removeable roof of a vehicle, at least one other of the supports directly connecting the cross-rail to a windshield frame of the vehicle; and
   a ladder engaging one of the side rails through the side rail accessory mounting channels.

17. The motor vehicle roof rack assembly of claim 15, wherein the plurality of crossbars each include a crossbar accessory mounting channel, and further comprising a plurality of channel plugs each configured to be received a respective one of the crossbar accessory mounting channels, the channel plugs extending longitudinally in a cross-vehicle direction when received within the respective one of the crossbar accessory mounting channels.

18. The motor vehicle roof rack assembly of claim 1, further comprising a plurality of coupling members that, when the roof rack is in the second configuration, are each partially received within a respective rail extender and within a respective side rail, wherein the plurality of coupling members are a polymer based material, wherein the rail extenders and the side rails are aluminum.

* * * * *